United States Patent [19]

Schwinning

[11] 4,262,389
[45] Apr. 21, 1981

[54] PRAWN/SHRIMP HEADING

[76] Inventor: Ludwig W. Schwinning, 6 Noongar Way, Riverton, Western Australia, Australia

[21] Appl. No.: 87,586

[22] Filed: Oct. 23, 1979

Related U.S. Application Data

[63] Continuation-in-part of Ser. No. 883,158, Mar. 2, 1978.

[51] Int. Cl.³ .............................................. A22C 29/02
[52] U.S. Cl. ...................................................... 17/71
[58] Field of Search .......................... 17/53, 71, 63, 12

Primary Examiner—Willie G. Abercrombie
Attorney, Agent, or Firm—Haseltine and Lake

[57] ABSTRACT

A prawn/shrimp heading machine comprising a first pair of endless belts arranged with one run of one belt substantially parallel to but spaced apart from one run of the other belt and travelling in the same direction to enable the bodies of the prawns/shrimp to be located therebetween with the heads projecting beyond the peripheries of the first one pair of belts, and a second pair of endless belts arranged in a similar manner to engage the heads of the prawns/shrimp, the path of the second pair of endless belts diverging from the path of the first pair of endless belts, each of the belts comprising a length of rubber belting, having a series of U-shaped metal members riveted thereto, at least one arm of the metal members being provided with prawn engaging teeth.

5 Claims, 11 Drawing Figures

PRAWN/SHRIMP HEADING

This invention relates to a prawn/shrimp heading machine and is a continuation-in-part of my U.S. Pat. application Ser. No. 883158 filed Mar. 2, 1978.

The object of the invention is to provide a prawn/shrimp heading machine which is simple in construction and operation and requires a minimum of manual labour for its operation.

In one form the invention resides in a prawn/shrimp heading machine comprising a first pair of endless belts arranged with one run of one belt substantially parallel to but spaced apart from one run of the other belt and travelling in the same direction to enable the bodies of the prawns/shrimp to be located therebetween with the heads projecting beyond the peripheries of the first one pair of belts, and a second pair of endless belts arranged in a similar manner to engage the heads of the prawns/shrimp, the path of the second pair of endless belts diverging from the path of the first pair of endless belts.

It is desirable that the prawns/shrimp be correctly orientated before being fed to the first pair of endless belts. This can be done by feeding the prawns through a hopper located above a pair of endless belts again arranged with one run of one belt substantially parallel to but spaced apart from one run of the other belt and travelling in the same direction with the plane of the belts substantially vertical. The heads are held by the upper edges of the belts and the bodies fall under gravity to a position between the belts.

The surface of the belts of the heading section in contact with the prawns are preferably of a non slip surface and may be provided with inwardly directed teeth.

The invention will be better understood by reference to the following description when read in conjunction with the accompanying drawings wherein.

Figure 1:
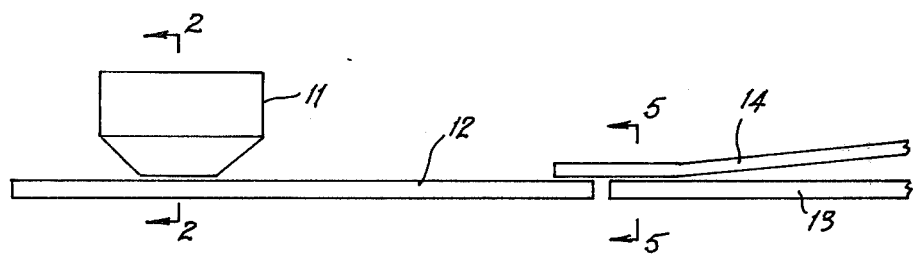
FIG. 1 is a diagrammatic side elevation.
Figure 2:
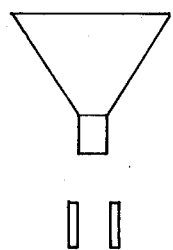
FIG. 2 is a section on line 2—2 of FIG. 1.
Figure 5:
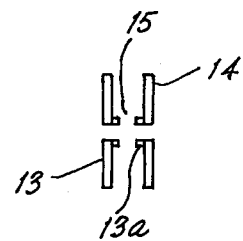
FIG. 5 is a section on line 5—5 of FIG. 1.
Figure 3:
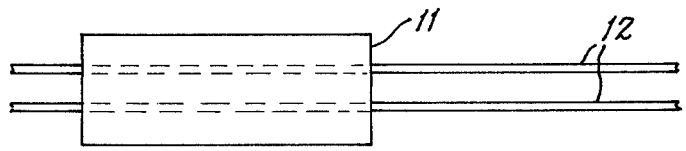
FIG. 3 is a diagrammatic partial plan view of the orientating section.
Figure 4:
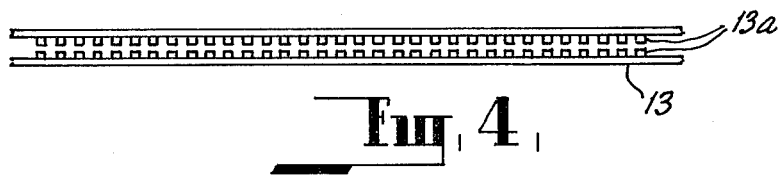
FIG. 4 is a diagrammatic partial plan view of one of the pairs of belts.

As shown in FIGS. 1 to 5 of the drawings a hopper 11 is positioned above a first pair of belts, the runs 12 of which are substantially vertical and spaced apart and travel in the same direction. Means are provided for adjusting the vertical angle of the belts 12 and the spacing there-between. The belts 12 are contiguous with a second pair of belts 13 which also have one run of one belt substantially parallel to and spaced apart from one run of the other belt and two runs travel in the same direction. Means are provided for adjusting the vertical angle of the belts 13 and the spacing therebetween. The upper edges of the belts are provided with inwardly projecting teeth 13A as shown in FIG. 4. A third pair of belts 14 are located above the belts 13 and are arranged in substantially the same manner, the lower edges of the belts 14 being provided with inwardly projecting teeth 15. The belts are substantially parallel to the belts 13 and then diverge away therefrom.

The prawns/shrimp after sorting for size are fed through the hopper 11 drop between the belts 12 which are adjusted so that the heads do not pass through. The bodies fall between the belts and the prawns/shrimp are carried forward with the heads projecting above the upper edge of the belts. The heads are engaged by the belts 14 and the prawns/shrimp pass from belts 12 to belts 13. As the belts 14 and 13 diverge the heads are pulled away from the bodies.

If desired the belts 12 and 13 may be combined as a single unit.

Figure 8:
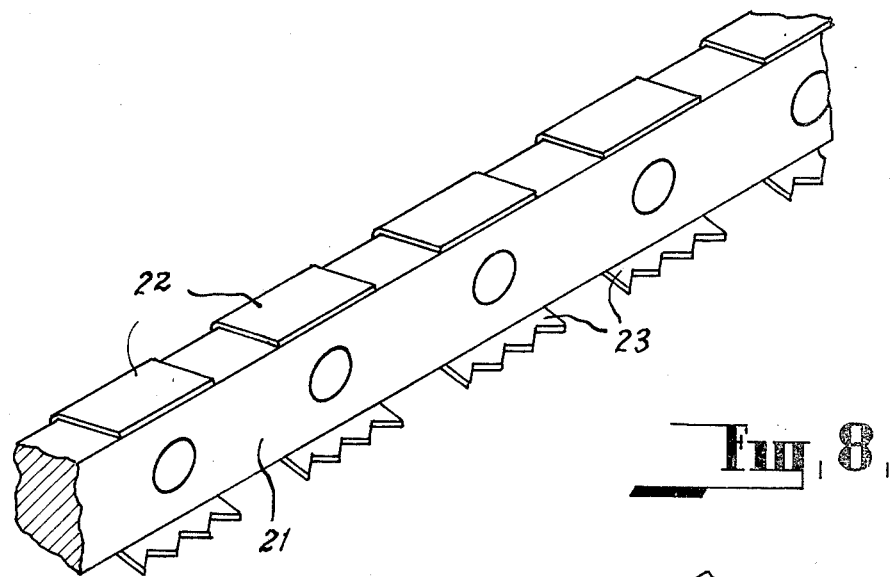
FIG. 8 is a perspective view showing the construction of one form of belt.
Figure 9:
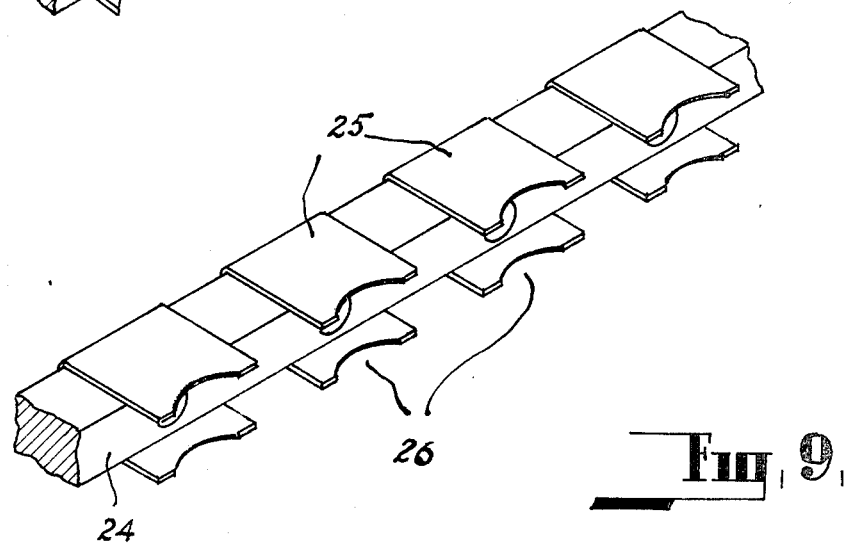
FIG. 9 is a perspective view showing the construction of a second form of belt.
Figure 10:
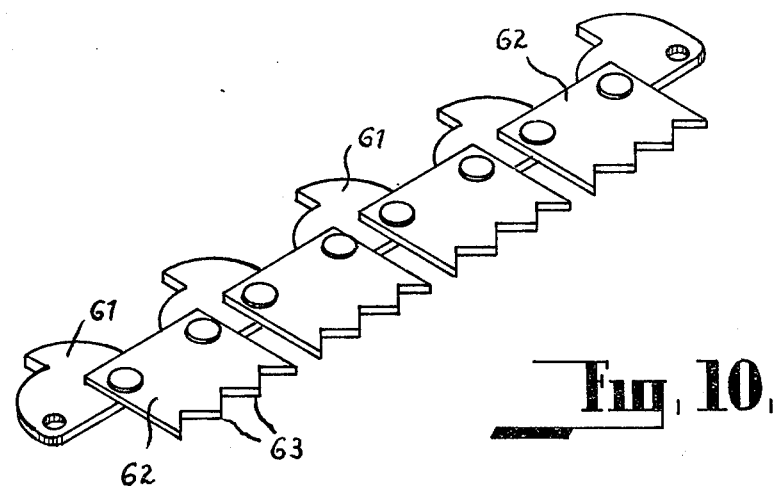
FIG. 10 is a fragmentary perspective view of a third form of belt.
Figure 11:
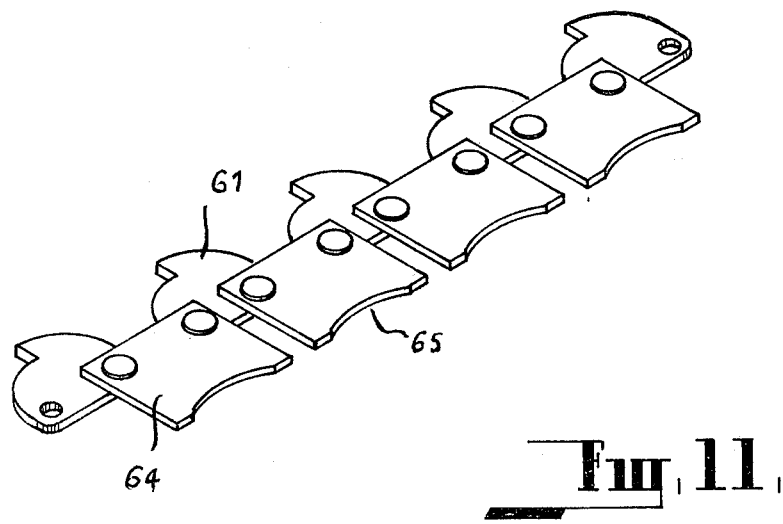
FIG. 11 is a fragmentary perspective of a fourth form of belt.

Four particular forms of belts suitable for the purpose of the present invention are shown in FIGS. 8, 9, 10 and 11 of the drawings. In FIG. 8 the belt comprises a length of fabric reinforced rubber belting 21 having a series of U-shaped metal members 22 riveted thereto, one arm 23 of the metal members projecting beyond the side of the belting 21 and its free end being serrated. The belt shown in FIG. 9 also comprises a length of fabric reinforced rubber belting 24 having a series of U-shaped metal members 25 riveted thereto. Both arms of the metal members project beyond the side of the belting, the free ends being provided with a cut away portion 26 to facilitate gripping of the prawn or shrimp. In the embodiment shown in FIGS. 10 and 11 of the drawings the belt comprises a series of links 61 of the type used in chain saws linked together by plates 62 as shown in FIG. 9 with teeth 63 on the outer edge to grip the prawn or shrimp. In FIG. 10 the plates 64 are each provided with an arcuate indentation 65 to grip the prawn or shrimp. The links 61 are provided with laterally projecting lugs 66 which run in supporting channels (not shown).

Figure 6:
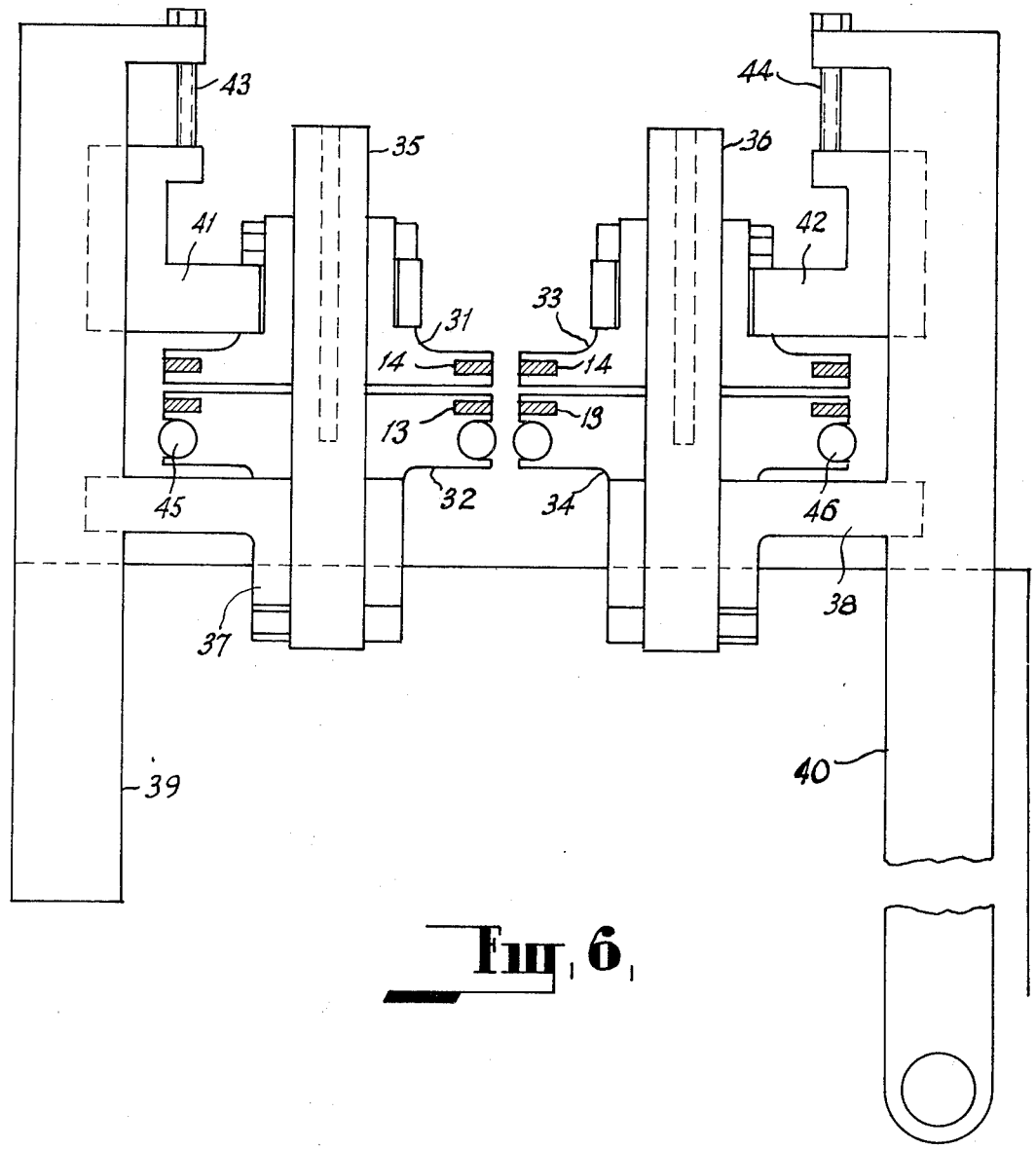
FIG. 6 is a transverse sectional view of the heading section.
Figure 7:
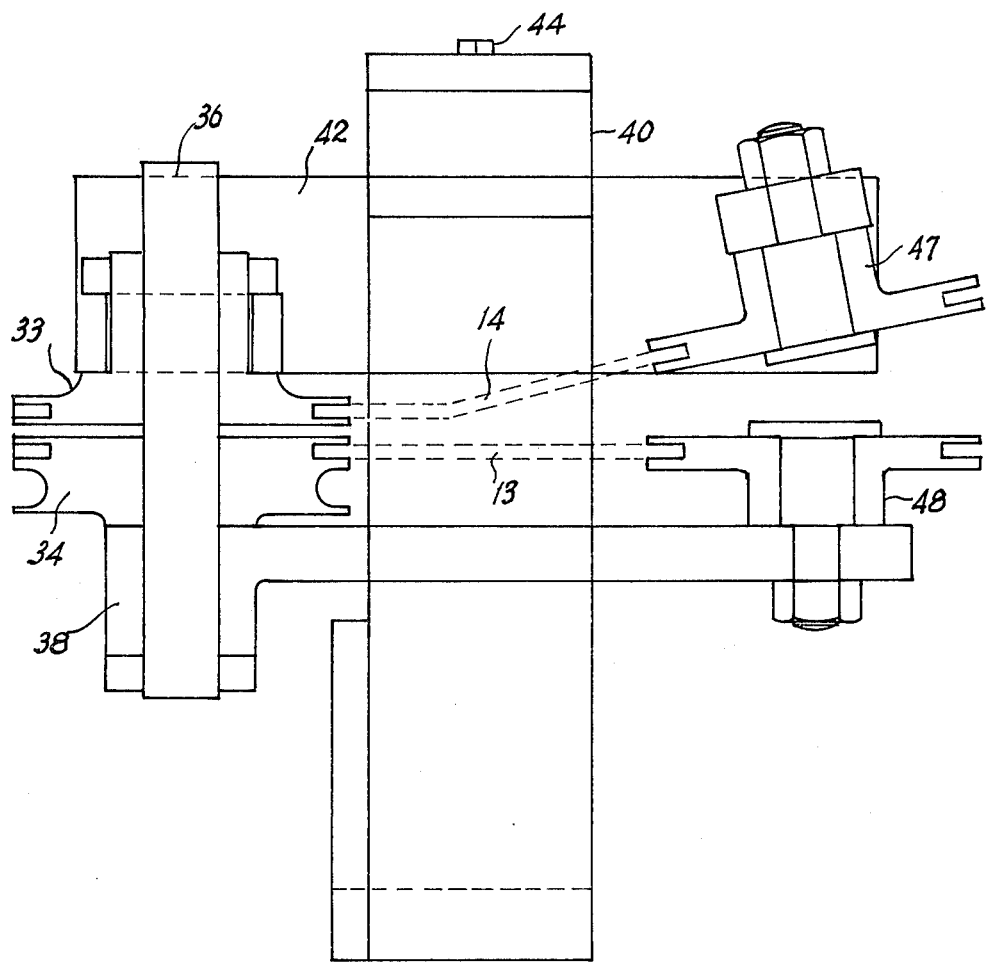
FIG. 7 is a longitudinal sectional view of the heading section.

A suitable form of construction of the machine is shown in FIGS. 6 and 7 of the drawings. As shown in FIG. 6 two pairs of pulleys 31, 32 and 33, 34 are mounted on shafts 35, 36 both of which are supported in suitable bearings in blocks 37, 38 mounted on a fixed arm 39 and a movable arm 40 respectively. The pulleys 31 and 33 are slidably mounted on the shafts 35 and 36 respectively and are supported by blocks 41 and 42 respectively which are slidably mounted on the arms 39 and 40. Adjusting screws 43 and 44 are provided for adjusting the position of the blocks 41 and 42 respectively. The arm 40 is pivotally mounted on its lower end and means (not shown) are provided for moving the arm towards or away from the fixed arm 39. Each pulley is provided with a groove to accommodate one of the prawn engaging belts 13, 14 whilst pulleys 32 and 34 are provided with grooves to accommodate driving belts 45 and 46. The belts 14 and 13 also engage pulleys 47, 48 mounted on blocks 33 and 38 remote from the pulleys 33 and 38. The pulleys 47 are mounted at an angle so that belt 14 moves upwardly away from belt 13 to effect the leading operation.

I claim:

1. A prawn/shrimp heading machine comprising a first pair of endless belts arranged with one run of one belt substantially parallel to but spaced apart from one run of the other belt and travelling in the same direction to enable the bodies of the prawns/shrimp to be located therebetween with the heads projecting beyond the peripheries of the first one pair of belts, and a second pair of endless belts arranged in a similar manner to engage the heads of the prawns/shrimp, the path of the second pair of endless belts diverging from the path of the first pair of endless belts each of the belts comprising a length of rubber belting having a series of U-shaped metal members riveted thereto, at least one arm of the metal members being provided with prawn engaging teeth.

2. A prawn/shrimp heading machine as claimed in claim 1 including a hopper located above a third pair of endless belts arranged with one run on one belt substantially parallel to but spaced apart from one run of the other belt and travelling in the same direction with the plane of the belts substantially vertical so that the heads of the prawns/shrimp are held by the upper edges of belts and the bodies fall under gravity to a position between the belts.

3. A prawn/shrimp heading machine comprising a first pair of endless belts arranged with one run of one belt substantially parallel to but spaced apart from one run of the other belt and travelling in the same direction to enable the bodies of the prawns/shrimp to be located therebetween with the heads projecting beyond the peripheries of the first one pair of belts, and a second pair of endless belts arranged in a similar manner to engage the heads of the prawns/shrimp, the path of the second pair of endless belts diverging from the path of the first pair of endless belts, each belt being formed of a series of links each adjacent pair of links being coupled together with a plate, the inner edge of which is provided with prawn engaging means.

4. A prawn/shrimp heading machine as claimed in claim 3 wherein the inner edge of each plate is provided with a series of teeth.

5. A prawn/shrimp heading machine as claimed in claim 4 wherein the plates are made of metal the inner edge of each plate is provided with a prawn engaging indentation.

* * * * *